US010516560B2

(12) United States Patent
Blasco Serrano et al.

(10) Patent No.: US 10,516,560 B2
(45) Date of Patent: Dec. 24, 2019

(54) EFFICIENT MULTIPLEXING OF CONTROL INFORMATION AND DATA TRANSMISSION

(71) Applicant: Telefonaktiebolaget LM Ericsson (publ), Stockholm (SE)

(72) Inventors: Ricardo Blasco Serrano, Espoo (FI); Hieu Do, Järfälla (SE); Stefano Sorrentino, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 93 days.

(21) Appl. No.: 15/739,237

(22) PCT Filed: Jun. 23, 2016

(86) PCT No.: PCT/SE2016/050625
§ 371 (c)(1),
(2) Date: Dec. 22, 2017

(87) PCT Pub. No.: WO2016/209156
PCT Pub. Date: Dec. 29, 2016

(65) Prior Publication Data
US 2019/0089564 A1 Mar. 21, 2019

Related U.S. Application Data

(60) Provisional application No. 62/185,273, filed on Jun. 26, 2015.

(51) Int. Cl.
*H04L 27/26* (2006.01)
*H04L 5/00* (2006.01)
(Continued)

(52) U.S. Cl.
CPC ........ *H04L 27/2608* (2013.01); *H04L 1/1664* (2013.01); *H04L 5/0044* (2013.01); *H04W 8/005* (2013.01); *H04W 76/14* (2018.02)

(58) Field of Classification Search
CPC . H04L 27/2608; H04L 1/1664; H04L 5/0053; H04L 5/0044; H04W 8/005; H04W 76/14
See application file for complete search history.

(56) References Cited

U.S. PATENT DOCUMENTS

2013/0136095 A1* 5/2013 Nishio .................. H04L 5/0007
370/329
2014/0071911 A1* 3/2014 Horiuchi ........... H04W 72/0406
370/329
(Continued)

FOREIGN PATENT DOCUMENTS

WO  2014126514 A1  8/2014

OTHER PUBLICATIONS

Unknown, Author, "D2D Physical Channels Design", 3GPP TSG RAN WG1 Meeting #77, R1-142398, Ericsson, May 19-23, 2014, 1-10.

*Primary Examiner* — Will W Lin
(74) *Attorney, Agent, or Firm* — Patent Portfolio Builders, PLLC

(57) ABSTRACT

The present disclosure pertains to a transmitter terminal (10), the transmitter terminal (10) being adapted for D2D communication and/or transmission. The transmitter terminal (10) is further being adapted for transmitting multiplexed control information and data, wherein the control information and data are multiplexed based on a mapping. The present disclosure also pertains to related devices and methods.

7 Claims, 7 Drawing Sheets

(51) Int. Cl.
*H04W 76/14* (2018.01)
*H04L 1/16* (2006.01)
*H04W 8/00* (2009.01)

(56) References Cited

U.S. PATENT DOCUMENTS

| | | | |
|---|---|---|---|
| 2015/0103789 A1* | 4/2015 | Tanaka | H04W 72/0426 370/329 |
| 2015/0163790 A1 | 6/2015 | Lee et al. | |
| 2016/0057693 A1* | 2/2016 | Nagata | H04W 8/005 370/254 |
| 2016/0183276 A1* | 6/2016 | Marinier | H04W 72/02 370/329 |
| 2016/0198455 A1* | 7/2016 | Caretti | H04B 17/318 370/329 |
| 2016/0353478 A1* | 12/2016 | Kim | H04W 72/12 |
| 2016/0373914 A1* | 12/2016 | Lee | H04W 8/005 |
| 2017/0171897 A1* | 6/2017 | Ryu | H04L 5/0044 |

* cited by examiner

EFFICIENT MULTIPLEXING OF CONTROL INFORMATION AND DATA TRANSMISSION

TECHNICAL FIELD

The present disclosure relates generally to D2D communication, especially the resource management of radio communication networks, in particular with the participation of vehicles.

BACKGROUND

During Release 12, the LTE standard has been extended with support of device-to-device (D2D) (specified as "sidelink") features targeting both commercial and Public Safety applications. Some applications enabled by Rel-12 LTE are device discovery, where devices are able to sense the proximity of other devices and associated applications by broadcasting and detecting discovery messages that carry device and application identities. Another application consists of direct communication based on physical channels terminated directly between devices.

SUMMARY

It is an object of the present disclosure to provide efficient use of resources for D2D communication, in particular in the context of V2x communication.

Accordingly, there is suggested a transmitter terminal, the transmitter terminal being adapted for D2D communication and/or transmission. The transmitter terminal further is adapted for transmitting multiplexed control information and data. The control information and data are multiplexed based on a mapping.

Moreover, there is disclosed a method for operating a transmitter terminal, the transmitter terminal being adapted for D2D communication and/or transmission. The method comprises transmitting control information and data in D2D communication, wherein transmitting comprises multiplexing the control information and data based on a mapping.

A receiver terminal is also discussed. The receiver terminal is adapted for D2D communication and/or reception. Further, the receiver terminal is adapted for receiving control information and data, wherein the control information and data are multiplexed based on a mapping.

There may be considered a method for operating a receiver terminal, the receiver terminal being adapted for D2D communication and/or reception. The method comprises receiving control information and data, wherein the control information and data are multiplexed based on a mapping.

Generally, the mapping may associate the resource/s used in transmission (for transmitting) of the control information to the resource/s used in transmission (for transmitting) of the data.

Moreover, a network node for a wireless communication network is proposed. The network node is adapted for configuring one or more terminals to perform any one of the methods disclosed herein.

A method for operating a network node for a wireless communication network may also be considered. The method comprises configuring one or more terminals to perform any one of the methods for operating a (transmitter and/or receiver) terminal disclosed herein.

Additionally, there is discussed a program product comprising code executable by control circuitry, the code causing the control circuitry to carry out and/or control any one of the methods disclosed herein.

There is also disclosed a carrier medium arrangement carrying and/or storing a program product as disclosed herein and/or code executable by control circuitry, the code causing the control circuitry to perform and/or control any one of the methods disclosed herein.

By multiplexing control information and data, in particular based on a mapping, efficient use of resources associated to control information and data is facilitated. In particular, the mapping may provide an association between control information and data (respectively, their associated resources), such that the level of interference or channel quality for control information and associated data is at least similar. Thus, multiplexing control information and data as suggested herein leads to improved resource management of resources associated to the control information and data.

BRIEF DESCRIPTION OF THE DRAWINGS

The drawings are provided to illustrate concepts and approaches of the disclosure and are not intended as limitation. The drawings comprise.

DETAILED DESCRIPTION

Figure 1:
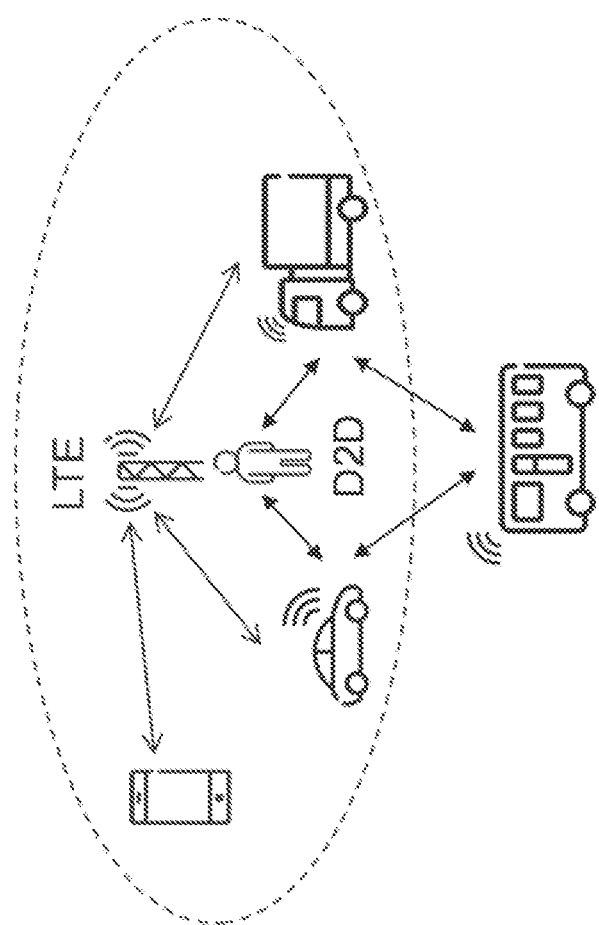
FIG. 1, showing examples of V2x scenarios for an LTE-based NW.

One of the potential extensions for the device-to-device work consists of support of V2x (Vehicle to anything) communication, which includes any combination of direct communication between vehicles, pedestrians and infrastructure. V2x communication may take advantage of a NW (network) infrastructure, when available, but at least basic V2x connectivity should be possible even in case of lack of coverage. Providing an LTE-based V2x interface may be economically advantageous because of the LTE economies of scale and it may enable tighter integration between communications with the NW infrastructure (V2I) and V2P and V2V communications, as compared to using a dedicated V2x technology. Generally, terms like or related to D2D, sidelink, peer-to-peer, ProSe (Proximity Services), direct communication may be used interchangeably. D2D communication may in particular comprise and/or be V2x communication.

V2x communications may carry both non-safety and safety information, where each of the applications and services may be associated with specific requirements sets, e.g., in terms of latency, reliability, capacity, etc. ETSI has defined two types of messages for road safety: Co-operative Awareness Message (CAM) and Decentralized Environmental Notification Message (DENM).

CAM: The CAM message is intended to enable vehicles, including emergency vehicles, to notify their presence and other relevant parameters in a broadcast fashion. Such messages target other vehicles, pedestrians, and infrastructure, and are handled by their applications. CAM message also serves as active assistance to safety driving for normal traffic. The availability of a CAM message is indicatively checked for every 100 ms, yielding a maximum detection latency requirement of <=100 ms for most messages. However, the latency requirement for Pre-crash sensing warning is 50 ms.

DENM: The DENM message is event-triggered, such as by braking, and the availability of a DENM message is also checked for every 100 ms, and the requirement of maximum latency is <=100 ms.

The package size of CAM and DENM message varies from 100+ to 800+ bytes and the typical size is around 300 bytes. The message is supposed to be detected by all vehicles in proximity.

The SAE (Society of the Automotive Engineers) also defined the Basic Safety Message (BSM) for DSRC with various messages sizes defined.

According to the importance and urgency of the messages, the BSMs are further classified into different priorities.

With the current LTE Rel-12 D2D specifications, it is necessary to transmit a scheduling assignment (SA) packet prior to the transmission of the actual data packet. The SA packet contains information that allows the receiver to process correctly the following data packet. However, this approach has two major drawbacks: first, it is necessary to dedicate specific resources for broadcasting the SA packets; and second, the decoding latency is increased because it is necessary to decode the SA prior to the data packets in order to obtain the message. Alternative approaches based on blind decoding (i.e., testing all possible control information message hypotheses of the data packets) at the receiving UE result in large computational demands for all but the simplest configurations.

There is proposed transmitting control information (e.g., an SA) and the associated data in resources overlapping in time, e.g., within the same LTE subframe. This may alleviate the latency issue.

There is disclosed an approach comprising multiplexing the control information, which may be information that is necessary for decoding a data packet, in a way that improves resource utilization. In some variants this may be done by using correlated resource allocations for control and data information on different resource pools. In some variants, efficiency may be enhanced by considering a single pool for transmission of control and data packets.

In addition or in the alternative, it is proposed to map some control information parameters to the DMRS sequences, in particular, the size of the DFT precoder. This allows improving the cubic metric (CM). The cubic metric may tend to increase when transmitting more than one message multiplexed in frequency in the same subframe, resulting in increased cost for the RF front end and reduced efficiency. The described approach allows limiting the CM.

Correlating the resource allocations for data and control information is suggested for a variant. This allows increasing or maximizing the probability of successfully decoding the data packet.

A common pool of resources for data and control packets instead of using different pools of resources may be used. This improves resource utilization.

Some variants allow for transmitting control information in-band with the data/data information by using the reference symbols (e.g., DMRS) to signal some parameters that are essential for decoding. This allows limiting or eliminating the need for blind decoding of the data.

In the following, the suggested approach is described in the context of D2D (sometimes called sidelink, peer to peer, ProSe) and particularly V2V. However, some of the variants are applicable to communication among any type of nodes.

D2D communication is currently under study/standardization as a technology enabler for V2V communication systems. Establishing one-to-many D2D communications is challenging from a control information message point of view. In particular, it is necessary that all the decoders know at least some of the parameters that were used for encoding the data packet (e.g., transport format (TF), time-frequency resources, etc.). One commonly adopted solution requires that the transmitter informs explicitly all the receivers about the parameters used to transmit the data packet as part of associated control information.

One possibility is to dedicate some special resources for broadcasting control information messages containing the necessary scheduling information (Scheduling Assignments, SA). That is, each UE uses a special procedure to notify the rest of the UEs about its intention to transmit using some specific transmission parameters. In LTE Rel-12/13 this may be done by defining pools of resources for SA transmission and pools of resources for associated data transmission. The SA indicates the resources and TF used by the associated data transmission. SAs are encoded using a predefined TF.

Dedicating specific resources for transmitting control information leads to an inefficient usage of the radio resources. One reason is that, in order to improve reliability, the set of time resources available for scheduling information and for data transmission must be significantly larger than the set of actually used resources. Such time redundancy is useful for coping with issues such as RF blocking (due to half-duplex transceivers), hidden nodes problem, and in general for interference reduction.

In the following, there is described a series of variants and how these solve or ameliorate at least one or some of the problems described so far. A receiver may be considered a receiver terminal (a terminal receiving and/or being the intended target of D2D communication/transmission), unless specifically identified as part of a terminal intended as receiving circuitry.

Generally, control information may pertain to and/or be associated to (specific) data. Control information may indicate transmission parameters and/or scheduling for the (specific) associated data. The expression "control information and data" may in particular refer to control information and the data associated to it, which may be specific data. Control information associated to data may in particular comprise information necessary to demodulate and/or decode the data.

Control information and/or data may be transmitted and/or received (and/or scheduled or intended for such) on associated resource/s. Control information may comprise information and/or one or more symbols related to transmission/transmission conditions/communication or transmission control, e.g. reference symbols, in particular one or more DMRS.

Control information and data may generally be multiplexed. It may be considered that control information and data are multiplexed if they are transmitted (and/or scheduled/intended for transmission, and respectively received and/or scheduled/intended for reception) in a common and/or the same resource arrangement and/or time interval, e.g. a subframe, which may be an arrangement and/or time interval utilized by the transmitter terminal transmitting the control information and data, in particular utilized exclusively.

Exclusive utilization may refer to only the transmitter terminal out of a number of terminals involved in sharing resources and/or accessing the same pool/s, for D2D communication transmitting utilizing the arrangement and/or time interval. A resource arrangement may comprise a pre-determined number of frequency resource units (e.g. subcarriers) and/or a pre-determined number of time resource units (e.g. a subframe, slot and/or a given number of symbols). An example of a resource arrangement is a resource block.

A wireless network may comprise at least a radio node and a terminal and/or at least two terminals, wherein the terminals may be adapted for D2D communication between them and/or with each other.

There may be generally considered a transmitter terminal, e.g. a transmitter terminal for a wireless communication network. The transmitter terminal may be adapted for D2D communication and/or transmission. It may be considered that the transmitter terminal is adapted for, and/or comprises a transmitting module for, transmitting control information and data.

Also, there may be considered a method for operating a transmitter terminal (which may be referred to as transmitter method in the following), e.g. any transmitter terminal as described herein. The method may comprise transmitting control information and data, in particular in D2D communication.

There may be generally considered a receiver terminal, e.g. a receiver terminal for a wireless communication network. The receiver terminal may be adapted for D2D communication and/or reception. It may be considered that the receiver terminal is adapted for, and/or comprises a receiving module for, receiving control information and data, in particular in D2D communication.

Also, there may be considered a method for operating a receiving terminal (sometimes referred to as receiver method in the following), e.g. any receiver terminal as described herein. The method may comprise receiving control information and data. A receiving terminal generally may be referred to as a receiver terminal.

The control information and data may generally be multiplexed. The transmitter method may comprise, and/or the transmitter terminal may be adapted for and/or comprise a multiplexing module for, multiplexing the control information and the data, e.g. before and/or while transmitting. Multiplexing may be based on a mapping. The receiver method may comprise, and/or the receiver terminal may be adapted for and/or comprise a demultiplexing module for, demultiplexing the control information and data, e.g. while and/or after receiving.

Demultiplexing may comprise associating received control information to corresponding data, e.g. based on a mapping, and/or demodulating and/or decoding data, in particular based on the control information (and/or information contained therein, e.g. pertaining to position and/or modulation and/or transport mode and/or coding of the data associated to the control information).

Transmitting and/or multiplexing may be based on a mapping. For example, transmitting and/or multiplexing may comprise associating the resource/s used and/or scheduled/intended for use in transmission of control information to the resource/s used and/or scheduled/intended for use in transmission of data based on a corresponding mapping and/or may be based on a mapping. A mapping may be associating, in particular uniquely associating, the resources with each other. It may be considered that the resource/s for the control information and the resource/s for the data are uniquely mapped and/or associated to each other.

Alternatively or additionally (e.g., as a second mapping, which may be independent of and/or orthogonal to a mapping of resources to resources), a mapping may associate specific resources and/or corresponding signaling (symbols) and/or corresponding transmission parameters (parameters pertaining to the transmission of the specific symbols and/or to transmission on the specific resources) to one or more transmission parameters of control information and/or data. Specific resources may e.g. be resources used for reference signaling (or related symbols) when transmitting a resource arrangement associated to the control information and/or data, e.g. DMRS signaling. For example, a specific pattern of specific resources (e.g., an arrangement of DMRS signaling or symbols in the time-frequency grid) may indicate a specific value of a transmission parameter.

It may be considered that a mapping of resources may refer to the positioning of the resources or specific signals transmitted/received on such resources, e.g. in relation to a resource arrangement (which may have a limited size), e.g. a resource block or subframe. A resource arrangement may generally be represented by a resource grid, e.g. a time-frequency grid, which may be based on time resource units and frequency resource units. Associating using and/or based on a mapping may be called mapping.

Transmission parameters may generally comprise parameters pertaining and/or indicating a modulation and/or (en)coding and/or DFT precoder or DFT precoder size and/or transport format and/or transmission bandwidth (which may be directly related to DFT precoder size) and/or message length, and/or MIMO configuration, etc.

Demultiplexing may be based on a mapping, e.g. any one of the mappings mentioned herein. In particular, demultiplexing may be based on the resource/s of the control information (respectively the associated position/s of the resource, e.g. in a resource or time/frequency or subcarrier grid) and/or the mapping. It may be considered that demultiplexing is based on a mapping of specific resources to one or more transmission parameters.

Generally, a mapping may be used for a transmitter/transmitter method and/or a receiver/receiver method and/or may be configured by a radio node or network node. A mapping may also refer to and/or comprise and/or indicate its reverse.

Receiving and/or multiplexing may generally (independent of the variant) include demodulating and/or decoding data based on decoded control information.

There may be considered a radio node and/or network node for a wireless communication network, the node being adapted for configuring one or more terminals to perform any one of the methods for operating a (transmitter and/or receiver) terminal described herein and/or adapted for configuring one or more terminals with one or more resource pools, in particular resource pools for D2D communication, and/or with or for any one of the mappings as described herein.

Configuring may comprise determining and/or allocating and/or selecting resources for one or more pools and/or at least one mapping and/or transmitting an indication of the resources and/or resource pool/s and/or mapping. An indication may be such that a receiving terminal is able to determine the indicated resources and/or pool/s and/or mapping based on the indication, e.g. by extracting it from the indication, and/or based on a reference and/or table, which may be stored in a memory of the terminal.

A variant 1 (data resources obtained from control info resources, separate pools) is described in the following. In one example, resources for transmitting control information may be in or of a first resource pool, whereas resources for transmitting data may be in or of a second resource pool. A mapping may associate resources from the first pool to resources from the second pool to map control information to data.

Figure 2:
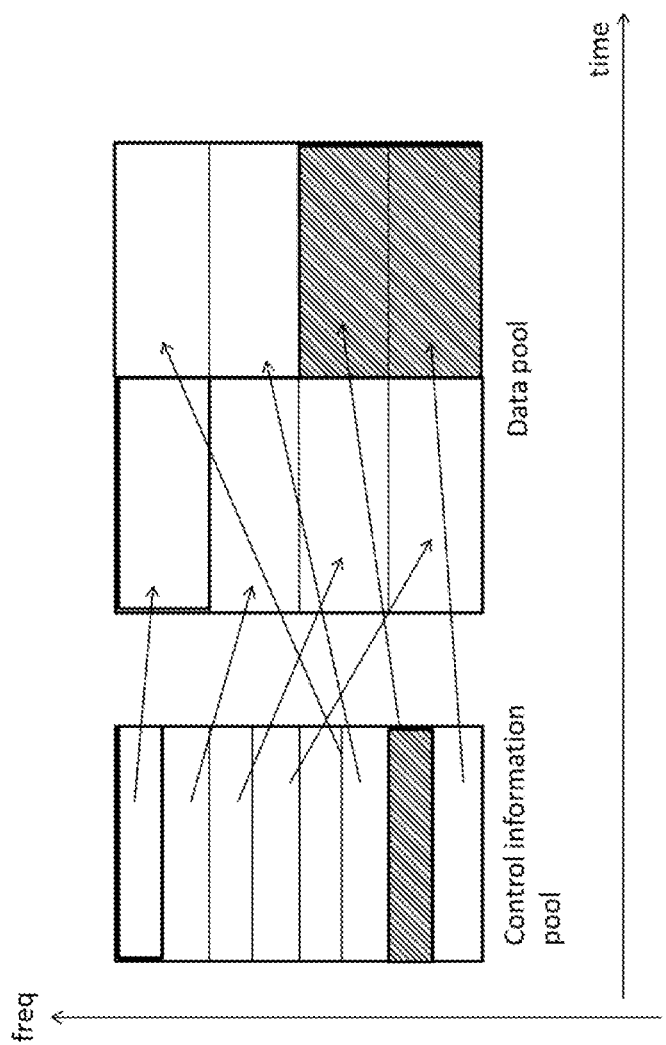
FIG. 2, showing an example of implicit data mapping based on a mapping rule.

Generally, a mapping rule for the control information and the associated data transmission may be defined, where the control information is transmitted within a pool of control information radio resources (first pool) and data is transmitted within a pool of data radio resources (second pool). An example of a rule is shown in FIG. 2, where each control information resource is mapped to a unique data resource. A mapping may be based on a mapping rule. Defining a mapping may be pre-defining, e.g. according to a default and/or standard, and/or comprise configuring by a network and/or network and/or radio node.

A general principle for the mapping rule may include that orthogonal data resources and/or data allocations are associated with orthogonal control information resources, and vice versa. The mapping may be implemented accordingly. The control information resources and the data resources may be grouped in pools (e.g., being configured accordingly, e.g. by the network or a radio node). It may be considered that the first pool and the second pool or such pools overlap in time.

The concept of resource here is intended in a generic way: e.g., a "resource" may comprise (re-)transmissions of the same data according to some time/frequency pattern.

A mapping from control information to data may comprise mapping control information and/or corresponding messages within one time resource to one or more data transmissions occurring at different times (different from the time for the control information and/or the times for different data transmissions being different). For example, a control information message may be mapped to a first transmission and a retransmission of a (data) message.

With this approach, interference on associated control and data messages is correlated. In other words, if a control message is interfered, the associated data is likely also interfered. More interestingly, if a control message is free from interference, most likely the associated data is also free from interference, which increases or maximizes detection success probability.

The mapping may be based on the resource/s for the control information, respectively its position.

It is noted that if the mapping rule is only based on the control information resource position and possibly other parameters known to the receiver, at least some parameters that identify the resources for data do not need to be explicitly signaled by the control information (e.g., frequency position, subframe index, number of retransmissions, bandwidth, etc.).

A variant 2 (data resources obtained from control info resources, common pool) is discussed in the following. Variant 1 improves efficiency as compared to e.g., the LTE Rel-12 D2D scheduling solution. Another improvement may be enabled by using common resources (e.g., taken from a common pool) for data and control information. Consider, for example, one subframe with N basic orthogonal resources multiplexed in frequency. Each transmitter may use N1 resources for transmitting control information and N2 resources for the associated data transmission. Note that control information may even be relevant for data transmissions in other subframes (e.g., for retransmissions). From a resource efficiency perspective, it can be shown that it is more efficient to access a single common pool of N resources than splitting it into multiple smaller pools, e.g., one for control info and one for data.

It may be considered that a mapping associates resources for control information from a first pool to resources for data from the same pool.

Figure 3:
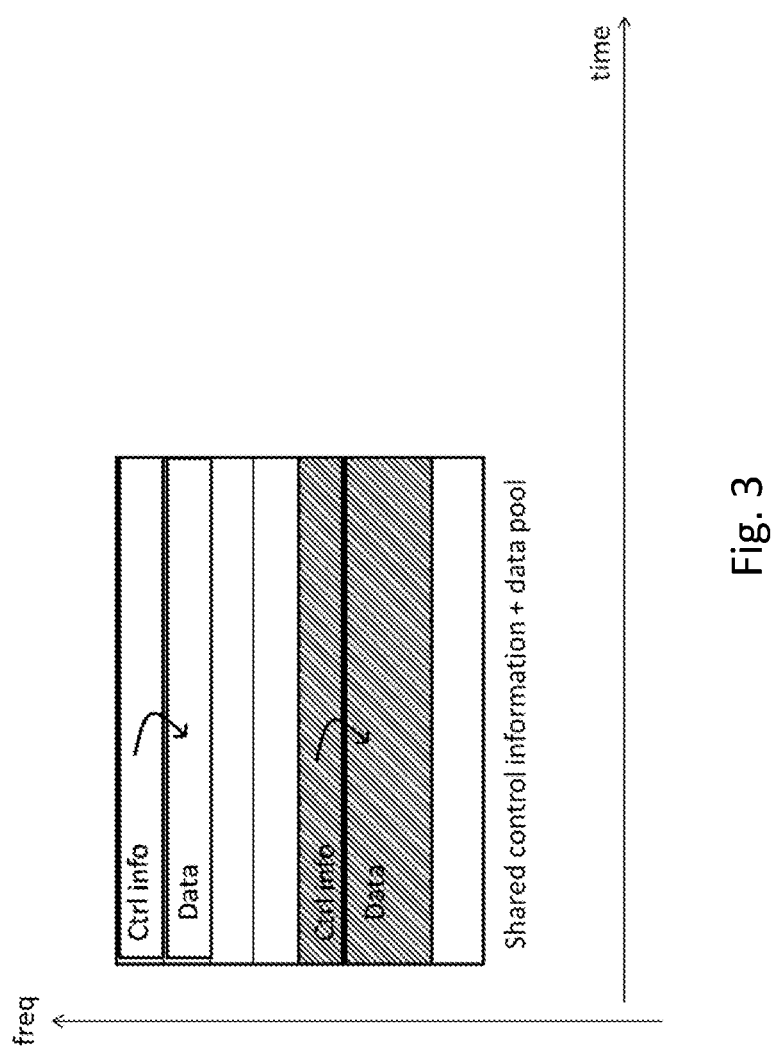
FIG. 3, showing an example of implicit data mapping based on control info in the same subframe.

A further enhancement may be considered, according to which data is mapped according to a predefined mapping rule based at least on the resource used for associated control information. The simplest mapping rule is that data is mapped adjacent to associated control information (see FIG. 3), e.g. in relation to a resource grid representing time resource units and frequency resource units, and/or representing implicit data mapping based on control info in the same subframe.

This solution is somewhat similar to variant 1, however in this case the resources for data and control information transmission are common and/or from the same pool (or not pooled at all and just available).

As a consequence, the variant 1 principle that orthogonal control information resources are mapped to orthogonal data resources may be broken here. It can be shown that variant 2 enables potentially more efficient resource allocation in a high load case as compared to Variant 1, provided that resources for control information and data are assigned efficiently. The algorithm for selection of resources for control information and data within the respective pool(s) is not discussed herein.

Also for variant 2, it is noted that if the mapping rule takes as input the control information resource position and possibly other parameters, which may be known to the receiver (e.g., stored in a memory and/or configured by a radio node or network node), at least some parameters that identify the resources for data do not need to be explicitly signaled by the control information message (e.g., frequency position, subframe index, number of retransmissions, etc.).

A variant 3 (use DMRS to signal detection parameters) is discussed in the following.

D2D transmission in LTE exploits single carrier OFDMA (SC-OFDMA), as it is usually using UL resources. With SC-OFDMA the signal is first spread by a DFT (Discrete Fourier Transform) precoder of size corresponding to a message BW (BandWidth) allocation and later mapped to an IDFT OFDM modulator with size related to the system BW.

The receiver needs to know the correct size of the DFT precoder to be applied when detecting/demodulating/decoding a message in order to de-spread the signal correctly and to avoid costly blind detections with different candidate DFT sizes. In case of control signal detection the receiver must typically be aware of additional transmission parameters useful for detection (e.g., coding rate, modulation order, transport block length, and so on).

In some cases, the receiver may not be aware of the DFT size or other useful transmission parameters in advance. Consider for example transmission of control information where at least some of the message transmission parameters are not pre-determined.

These (transmission) parameters may comprise the transmission bandwidth (directly related to DFT precoder size), and/or coding and/or modulation parameters, and/or message length, and/or MIMO configuration, etc.

The parameters useful for detection of the message may be mapped to transmission parameters and/or resources of the reference signals (e.g., DMRS) associated with the transmission. For example, multiple DMRS sequences (or equivalently different mappings of the sequences to time/ frequency resources) may be defined and each sequence may be associated with a set of transmission parameter values according to a rule or pre-defined mapping.

The mapping may be based on any parameter used for forming the DMRS sequence such as the base sequence index, the cyclic shift index, the orthogonal cover code index, etc, and/or the resources used.

The transmitter may be adapted to select, and/or transmitting and/or multiplexing may comprise transmitting, the DMRS sequence corresponding to the parameters used for transmission, e.g. based on the mapping.

The receiver may be adapted to detect, and/or receiving and/or demultiplexing may comprise receiving, a DMRS sequence and/or reference signaling, in particular on specific resources. It may be considered that detecting (e.g. by the receiver or a detecting module of the receiver) demultiplexing and/or receiving comprises determining the transmission parameters according to and/or based on the mapping rule, and/or demodulating and/or decoding the rest of the transmission (and/or the control information and/or data) based on the parameters indicated using DMRS or other specific resources or symbols or reference signaling. It is observed that detecting a DMRS sequence is computationally cheaper than attempting detection and/or (blind) decoding with multiple potential parameters.

A variant 4 (use DMRS to signal DFT size for control+data) is discussed in the following. In this further variant, in particular in variation and/or derivation of Variant 3, transmitting may comprise transmitting the control information and associated transmission using a common DFT precoder in the SC-OFDMA modulation. In this case, the DMRS may be exploited to indicate at least the bandwidth for the transmission, corresponding to the DFT size. Similarly, DMRS may be exploited to indicate the length of the control and/or data message or other parameters associated with coding or channel coding (which may be seen as a form of coding/encoding) and/or modulation for control info and/or data.

Figure 4:
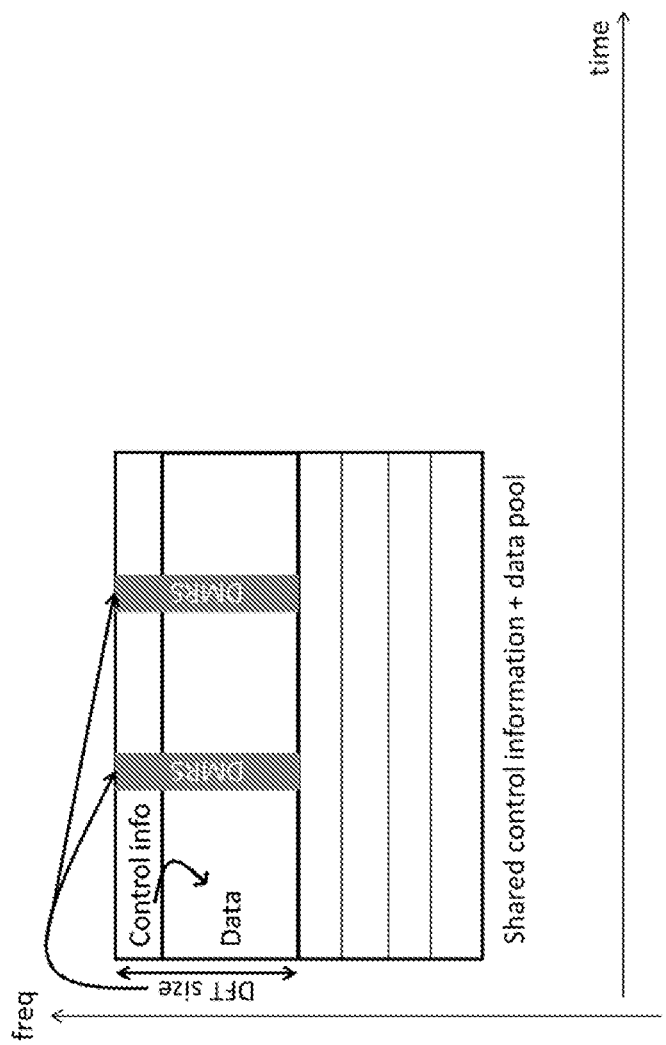
FIG. 4, showing an example of the combination of two variants (2 and 4) of the approaches described herein to solve a CM problem.

The combination of variant 4 with variant 2 is particular suitable to limit or solve the CM problem. More explicitly, at the transmitter, data and control information may be multiplexed on adjacent frequencies. Then, a single DFT precoder may used to spread data and control information at the same time, thus achieving good CM properties. That is, the size of the DFT precoder may correspond to the sum of the data bandwidth and control bandwidth (the bandwidths associated to the transmission of control information and data, respectively). This size is signaled using DMRS, and/or a mapping of DMRS resources or symbols or transmission parameters to the size. This is illustrated in FIG. 4.

Receiving and/or demultiplexing may comprise receiving, and/or the receiver first detects, the DMRS sequence (in the resource arrangement) used in transmission and correspondingly the size of the DFT precoder, e.g. using a determination like an estimation or calculation and/or based on the mapping. Receiving and/or demultiplexing may comprise decoding and/or demodulating the control information based on the mapping and/or a determining a DFT precoder size based on the mapping. Further, receiving and/or multiplexing may comprise demodulating and/or decoding control information based on such size. For example, using the size (e.g., an estimate or determination result for the size), the receiver may first decode the control information. The control information may include information on how to decode the data information.

Receiving and/or multiplexing may generally (independent of the variant) include demodulating and/or decoding data based on decoded control information.

A variant 5 (DMRS construction rules) is discussed in the following. DMRS sequences are defined in LTE based on Zadoff Chu sequences whose length reflects the message transmission bandwidth. In the context of in particular Variants 3 and 4, it would be efficient if the receiver could identify the DMRS sequence based on detection of a limited BW of the transmission, e.g., the smallest supported transmission BW. This is also because the receiver may not know a priori what is the effective BW used for a certain transmission until after the DMRS sequence has been identified. To improve DMRS detection based on a single predefined "small" BW, it is suggested basing DMRS for D2D transmission on base sequences of predefined length. Such base sequences may be concatenated in frequency domain. A predefined mapping between frequency resources and base sequence may be defined, such that the base sequence index is potentially not the same over the entire system BW (See FIG. 5). In fact, concatenating short base sequences with different indexes in frequency domain provides better correlation and CM than replicating the same DMRS multiple times.

Figure 5:
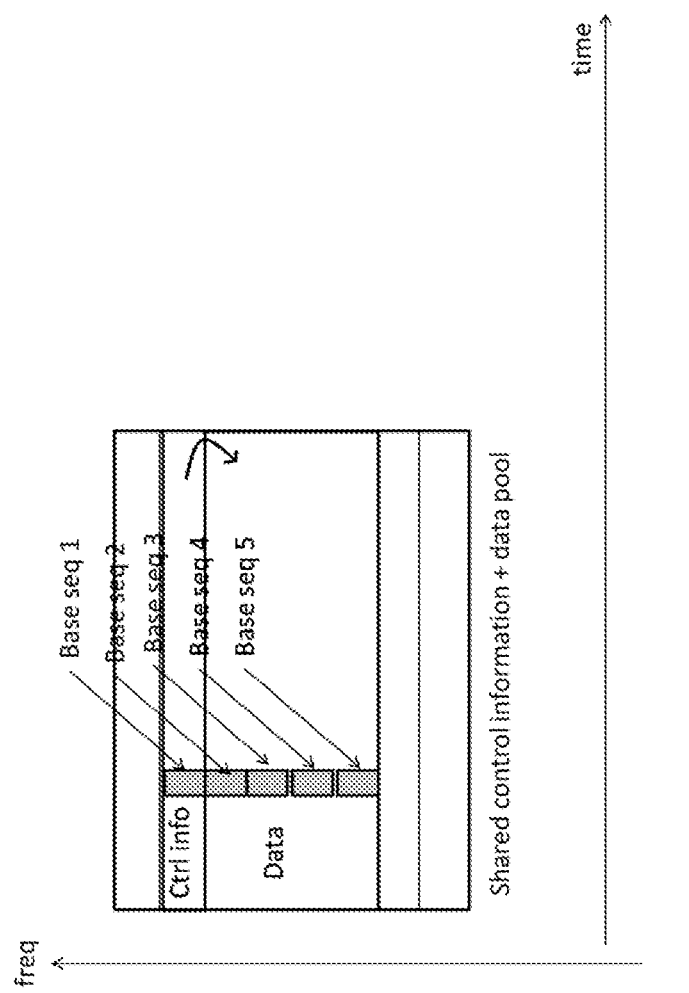
FIG. 5, showing an example of DMRS base sequence mapping.

The "DMRS sequence" may be obtained by combining a base sequence with some cyclic shift (i.e., linearly increasing phase offset in frequency domain) and an orthogonal cover code in time domain. A base sequence may be subject to group hopping and/or sequence hopping. FIG. 5 shows an example of DMRS base sequence mapping.

A mapping of reference signals may comprise defining and/or determining one or more DMRS sequences according to such rule/s and/or selecting a DMRS sequence defined accordingly.

There may be considered a radio node and/or transmitter terminal adapted for defining and/or selecting one or more DMRS sequences for one or more D2D transmissions according to such rule/s. The radio node may be adapted for configuring one or more terminals with such DMRS sequence/s. Alternatively or additionally, there may be considered a transmitter terminal and/or radio node adapted for transmitting D2D transmissions utilizing and/or based on such and/or the selected DMRS sequence/s.

A method for operating a radio node and/or transmitter terminal may be considered, which may be called DMRS method in short. The method may comprise defining and/or selecting one or more DMRS sequences for one or more D2D transmissions according to such rule/s. It may be considered that a (DMRS) method for operating a radio node comprises configuring one or more terminals with such DMRS sequence/s. Alternatively or additionally, the method may comprise transmitting D2D transmissions utilizing and/or based on such and/or the selected DMRS sequence/s.

There is suggested multiplexing the control information necessary for decoding and/or associated to a data packet in a way that improves resource utilization. In some variants this is done by using correlated resource allocations for control and data information on different resource pools. In some variants efficiency is enhanced by considering a single pool for transmission of control and data packets. To obtain good CM properties, it is proposed to map some control information parameters to the DMRS sequences, in particular, the size of the DFT precoder.

Figure 6:
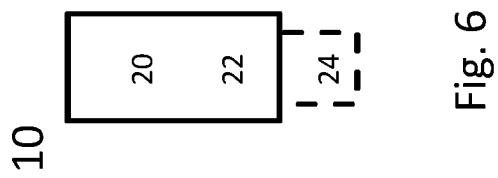
FIG. 6, showing an exemplary terminal.

FIG. 6 schematically shows a user equipment 10 as an example of a terminal. User equipment 10 comprises control circuitry 20, which may comprise a controller connected to a memory. Any module of a user equipment may be implemented in and/or executable by, user equipment, in particular the control circuitry 20. User equipment 10 also comprises radio circuitry 22 providing receiving and transmitting or transceiving functionality, the radio circuitry 22 connected or connectable to the control circuitry. An antenna circuitry 24 of the user equipment 10 is connected or connectable to the radio circuitry 22 to collect or send and/or amplify signals. Radio circuitry 22 and the control circuitry 20 controlling it are configured for cellular communication and/or D2D communication, in particular utilizing E-UTRAN/LTE resources as described herein. The user equipment 10 may be adapted to carry out any of the methods for operating a radio node or terminal disclosed herein; in particular, it may comprise corresponding circuitry, e.g. control circuitry.

Figure 7:
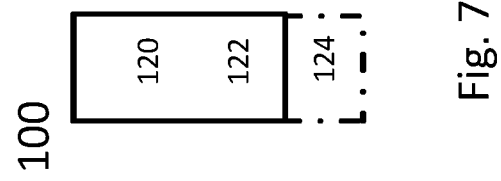
FIG. 7, showing an exemplary network node.

FIG. 7 schematically show a network node or base station 100 as an example of a radio node, which in particular may be an eNodeB. Network node 100 comprises control circuitry 120, which may comprise a controller connected to a memory. Any module of a network node, e.g. a receiving module and/or transmitting module and/or control or processing module and/or scheduling module, may be implemented in and/or executable by the network node, in particular the control circuitry 120. The control circuitry 120 is connected to control radio circuitry 122 of the network node 100, which provides receiver and transmitter and/or transceiver functionality. An antenna circuitry 124 may be connected or connectable to radio circuitry 122 for signal reception or transmittance and/or amplification. The network node 100 may be adapted to carry out any of the methods for operating a radio node disclosed herein; in particular, it may comprise corresponding circuitry, e.g. control circuitry.

Some useful abbreviations comprise

| Abbreviation | Explanation |
| --- | --- |
| 3G | Third Generation of Mobile Telecommunications Technology |
| BSM | Basic Safety Message |
| BW | Bandwidth |
| CAM | Cooperative Awareness Message |
| DPTF | Data Packet Transmission Format |
| D2D | Device-to-Device Communication |
| DENM | Decentralized Environmental Notification Message |
| DMRS | DeModulation Reference Signal |
| DSRC | Dedicated Short-Range Communications |
| eNB | eNodeB |
| ETSI | European Telecommunications Standards Institute |
| (I)DFT | (Inverse) Discrete Fourier Transform |
| LTE | Long-Term Evolution |
| NW | Network |
| OFDM | Orthogonal Frequency-Division Multiplexing |
| RA | Resource Allocation |
| RS | Reference Signals |
| SA | Scheduling Assignment |
| SAE | Society of the Automotive Engineers |
| TF | Transport Format |
| UE | User Equipment |
| V2I | Vehicle-to-Infrastructure |
| V2P | Vehicle-to-Pedestrian |
| V2V | Vehicle-to-vehicle communication |
| V2x | Vehicle-to-anything-you-can-imagine |
| wrt | with respect to |

This abbreviation may be used according to the LTE standard if applicable.

In the context of this description, wireless communication may be communication, in particular transmission and/or reception of data, via electromagnetic waves and/or an air interface, in particular radio waves, e.g. in a wireless communication network and/or utilizing a radio access technology (RAT). The communication may involve one or more than one terminal (which may be used interchangeably with user equipment) connected to a wireless communication network and/or more than one node of a wireless communication network and/or in a wireless communication network. It may be envisioned that a radio node, e.g. in or for communication, and/or in, of or for a wireless communication network is adapted for communication utilizing one or more RATs, in particular LTE/E-UTRA. A communication may generally involve transmitting and/or receiving messages, in particular in the form of packet data or a data packet.

A message or packet may comprise control information and/or payload data and/or represent and/or comprise a batch of physical layer transmissions.

Control information or control data may generally refer to data pertaining to the process of communication and/or nodes and/or terminals of the communication. Control information and/or data may be transmitted and/or provided and/or received in one or more resources and/or resource elements, which may be separate or continuous in time and/or frequency. It may be considered that control information is represented by one or more symbols. A resource or resource element may comprise a frequency resource unit, e.g. a subcarrier, and an associated time resource unit, e.g. symbol length in time and/or slot. Resources or resource elements may be arranged in a larger unit, e.g. a resource block, which may comprise a pre-determined number of time resource units and a pre-determined number of frequency resource units, e.g. 1 slot and 12 subcarriers in some examples.

Control information in particular may comprise information indicating scheduling and/or coding and/or modulation and/or transport format of data associated to it, in particular one or more data packages and/or data provided on one or more resources (e.g., resource blocks). It may, e.g., include address data referring to a node or terminal of the communication and/or data pertaining to the transmission mode and/or spectral configuration and/or frequency and/or coding and/or timing and/or bandwidth as data pertaining to the process of communication or transmission, e.g. in a header. Data may in particular comprise user data and/or payload data and/or any other information or data (which is not control information). Data may be associated to control information.

Any node or terminal (like a UE) may comprise radio circuitry and/or control circuitry and/or antenna circuitry, which may be arranged to utilize and/or implement one or more than one radio access technologies. Radio circuitry of a node or terminal may generally be adapted for the transmission and/or reception of radio waves, and in particular may comprise a corresponding transmitter circuitry and/or receiver circuitry and/or transceiver circuitry, which may be connected or connectable to antenna circuitry and/or control circuitry. Control circuitry of a node or terminal may comprise a controller and/or memory arranged to be accessible for the controller for read and/or write access. The controller may be arranged to control the communication and/or the radio circuitry and/or provide additional services. Circuitry of a node or terminal, in particular control circuitry, e.g. a controller, may be programmed to provide the functionality described herein. A corresponding program code may be stored in an associated memory and/or storage medium and/or be hardwired and/or provided as firmware and/or software and/or in hardware. A controller may generally comprise a processor and/or microprocessor and/or microcontroller and/or FPGA (Field-Programmable Gate Array) device and/or ASIC (Application Specific Integrated Circuit) device. More specifically, it may be considered that control circuitry comprises and/or may be connected or connectable to memory, which may be adapted to be accessible for reading and/or writing by the controller and/or control circuitry. Radio access technology may generally comprise, e.g., Bluetooth and/or Wifi and/or WI MAX and/or cdma2000 and/or GERAN and/or UTRAN and/or in particular E-Utran and/or LTE. A communication may in particular comprise a physical layer (PHY) transmission and/or reception, onto which logical channels and/or logical transmission and/or receptions may be imprinted or layered.

A radio node, e.g. of or for a wireless communication network, may be implemented as a terminal and/or user equipment and/or network node and/or base station (e.g. eNodeB) and/or relay node and/or any device generally adapted for communication in a wireless communication network, in particular cellular communication and/or D2D communication.

A wireless communication network or cellular network may comprise a network node, in particular a radio network node, which may be connected or connectable to a core network, e.g. a core network with an evolved network core, e.g. according to LTE. A network node may e.g. be a base station. The connection between the network node and the core network/network core may be at least partly based on a cable/landline connection. Operation and/or communication and/or exchange of signals involving part of the core network, in particular layers above a base station or eNB, and/or via a predefined cell structure provided by a base station or eNB, may be considered to be of cellular nature or be called cellular operation.

A terminal may be implemented as a user equipment; it may generally be considered that a terminal is adapted to provide and/or define an end point of a wireless communication (in particular D2D communication and/or cellular communication) and/or for a wireless communication network. A terminal or a user equipment (UE) may generally be a device configured for wireless device-to-device communication and/or a terminal for a wireless and/or cellular network, in particular a mobile terminal, for example a mobile phone, smart phone, tablet, PDA, etc. A user equipment or terminal may be a node of or for a wireless communication network as described herein, e.g. if it takes over some control and/or relay functionality for another terminal or node. It may be envisioned that terminal or user equipment is adapted for one or more RATs, in particular LTE/E-UTRA. It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. It may be considered that a terminal or user equipment is configured to be a terminal or user equipment adapted for LTE/E-UTRAN.

A control node may be a radio node, e.g. a network node or base station (e.g. eNodeB or eNB), which may be any kind of base station of a wireless and/or cellular network adapted to serve one or more terminals or user equipments. It may be considered that a base station is a node or network node of a wireless communication network. A network node or base station may be adapted to provide and/or define and/or to serve one or more cells of the network and/or to allocate frequency and/or time resources for communication to one or more nodes or terminals of a network. Generally, any node adapted to provide such functionality may be considered a base station. It may be considered that a base station or more generally a network node, in particular a radio network node, comprises radio circuitry and/or control circuitry for wireless communication. It may be envisioned that a base station or network node is adapted for one or more RATs, in particular LTE/E-UTRA. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A base station may be arranged to be a node of a wireless communication network, in particular configured for and/or to enable and/or to facilitate and/or to participate in cellular communication, e.g. as a device directly involved or as an auxiliary and/or coordinating node.

Generally, a base station may be arranged to communicate with a core network and/or to provide services and/or control to one or more user equipments and/or to relay and/or transport communications and/or data between one or more user equipments and a core network and/or another base station. A network node or base station may generally be adapted to allocate and/or schedule time/frequency resources of a network and/or one or more cells serviced by the base station. An eNodeB (eNB) may be envisioned as an example of a base station, e.g. according to an LTE standard. It may be considered that a base station is configured as or connected or connectable to an Evolved Packet Core (EPC) and/or to provide and/or connect to corresponding functionality. The functionality and/or multiple different functions of a base station may be distributed over one or more different devices and/or physical locations and/or nodes. A base station may be considered to be a node of a wireless communication network. Generally, a base station may be considered to be configured to be a control node and/or coordinating node and/or to allocate resources in particular for cellular communication via one or more than one cell, and/or to allocate resources and/or one or more resource pools for D2D communication. Allocating resources may generally comprise configuring one or more terminals accordingly, e.g. by transmitting corresponding allocation data.

It may be considered for cellular communication there is provided at least one uplink (UL) connection and/or channel and/or carrier and at least one downlink (DL) connection and/or channel and/or carrier, e.g. via and/or defining a cell, which may be provided by a network node, in particular a base station or eNodeB. An uplink direction may refer to a data transfer direction from a terminal to a network node, e.g. base station and/or relay station. A downlink direction may refer to a data transfer direction from a network node, e.g. base station and/or relay node, to a terminal. UL and DL may be associated to different frequency resources, e.g. carriers and/or spectral bands. A cell may comprise at least one uplink carrier and at least one downlink carrier, which may have different frequency bands.

A network node, in particular a base station, and/or a terminal, in particular a UE, may be adapted for communication in spectral bands (frequency bands) licensed and/or defined for LTE.

Resources or communication resources may generally be physical resources and/or frequency and/or time resources, which may comprise e.g. frames, subframes, slots, resource blocks, carriers, subcarriers, channels, frequency/spectral bands, etc. Allocated or scheduled resources may comprise and/or refer to frequency-related information, in particular regarding one or more carriers and/or bandwidth and/or subcarriers and/or time-related information, in particular regarding frames and/or slots and/or subframes, and/or regarding resource blocks and/or time/frequency hopping information. Transmitting on or with allocated resources and/or utilizing allocated resources may comprise transmitting data on the resources allocated, e.g. on the frequency and/or subcarrier and/or carrier and/or timeslots or subframes indicated. It may generally be considered that allocated resources may be released and/or de-allocated.

Allocation data may be considered to be data indicating and/or granting resources allocated by a network node, e.g. a controlling and/or allocation node, in particular data identifying or indicating which resources and/or resource pools are reserved or allocated, e.g. for cellular communication, which may generally comprise transmitting and/or receiving data and/or signals; the allocation data may indicate a resource grant or release and/or resource scheduling and/or one or more resource pools. A grant or resource grant may be considered to be one example of allocation data. It may be considered that an allocation node is adapted to transmit allocation data directly to a node and/or indirectly, e.g. via a relay node and/or another node or base station. Allocation data may comprise control information or data and/or be part of or form a message, in particular according to a predefined format, for example a DCI format, which may be defined in a standard, e.g. LTE. In particular, allocation data may comprise information and/or instructions to reserve resources or to release resources, which may already be allocated. A terminal may generally be adapted to perform transmission of data to, e.g. UL data, and/or reception of data from, a network node and/or to more than one network nodes, according to allocation data and/or resources and/or transmission parameters determined and/or allocated.

There may be considered a radio node adapted for performing any one of the methods for operating a radio node described herein. It may be considered that a radio node is adapted for transmitting as well as receiving or decoding, to enable two-way communication using the prescribed approach. In this case, the transmission parameters and/or resources for transmitting may be different from those for receiving.

There may be considered a terminal or user equipment adapted for performing any one of the methods for operating a radio node or terminal or user equipment described herein.

There is also disclosed a program product comprising code executable by control circuitry, the code causing the control circuitry to carry out and/or control any one of the method for operating a terminal or user equipment or radio node as described herein, in particular if executed on control circuitry, which may be control circuitry of a terminal or user equipment or a radio node as described herein.

Moreover, there is disclosed a carrier medium arrangement carrying and/or storing at least any one of the program products described herein and/or code executable by control circuitry, the code causing the control circuitry to perform and/or control at least any one of the methods described herein.

A carrier medium arrangement may comprise one or more carrier media. Generally, a carrier medium may be accessible and/or readable and/or receivable by control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A terminal user equipment configured with a certain configuration (or according to control information) may be set and/or operational according to the configuration or based on the control information and/or the transmission parameters and/or radio resources indicated by the control information; the configuration may be configured by a network and/or network node, e.g. by transmitting corresponding information (the information may represent the configuration), and/or by itself, e.g. based on determining and/or deciding and/or allocating the resources and/or parameters.

Configuring a radio node or terminal or UE, e.g. by a network or network node, may comprise transmitting, by the network or network node, one or more parameters and/or commands and/or allocation or control data to the radio node or terminal or UE, and/or the terminal or UE changing its configuration and/or setup, e.g. based on received parameters and/or commands and/or allocation data from the network and/or the network node.

A terminal (which may also be called a user equipment (UE)) may generally be a device configured for wireless device-to-device communication (it may be a D2D device) and/or a terminal for a wireless and/or cellular network, in particular a mobile terminal, for example a mobile phone, smart phone, tablet, PDA, etc. A terminal or user equipment may be a node of or for a wireless communication network as described herein. It may be envisioned that a terminal or user equipment or D2D device is adapted for one or more RATs, in particular LTE/E-UTRA. A terminal or user equipment may generally be proximity services (ProSe) enabled, which may mean it is D2D capable or enabled. It may be considered that a terminal or user equipment comprises radio circuitry and/control circuitry for wireless communication. Radio circuitry may comprise for example a receiver device and/or transmitter device and/or transceiver device. Control circuitry may include a controller, which may comprise a microprocessor and/or microcontroller and/or FPGA (Field-Programmable Gate Array) device and/or ASIC (Application Specific Integrated Circuit) device. It may be considered that control circuitry comprises or may be connected or connectable to memory, which may be adapted to be accessible for reading and/or writing by the controller and/or control circuitry. A node or device of or for a wireless communication network may generally be a terminal or user equipment or D2D device. It may be considered that a terminal or user equipment is configured to be a terminal or user equipment adapted for and/or according to LTE/E-UTRAN. Generally, the terms ProSe, D2D, device-to-device and peer-to-peer communication may be used interchangeably.

A storage medium may be adapted to store data and/or store instructions executable by control circuitry and/or a computing device, the instruction causing the control circuitry and/or computing device to carry out and/or control any one of the methods described herein when executed by the control circuitry and/or computing device. A storage medium may generally be computer-readable, e.g. an optical disc and/or magnetic memory and/or a volatile or non-volatile memory and/or flash memory and/or RAM and/or ROM and/or EPROM and/or EEPROM and/or buffer memory and/or cache memory and/or a database.

A radio node or network device or node or a user equipment may be or comprise a software/program arrangement arranged to be executable by a hardware device, e.g. control circuitry, and/or storable in a memory, which may provide dual connectivity functionality and/or corresponding control functionality and/or control functionality to carry out any one of the methods described herein and/or to implement any one or more than one functionalities of a user equipment and/or network node described herein.

Radio spectrum: Although at least some of the embodiments may be described for D2D transmissions in the UL spectrum (FDD) or UL resources (TDD), the embodiments are not limited to the usage of UL radio resources, neither to licensed or unlicensed spectrum, or any specific spectrum at all.

A cellular network or mobile or wireless communication network may comprise e.g. an LTE network (FDD or TDD), UTRA network, CDMA network, WiMAX, GSM network, any network employing any one or more radio access technologies (RATs) for cellular operation. The description herein is given for LTE, but it is not limited to the LTE RAT. RAT (radio access technology) may generally include: e.g. LTE FDD, LTE TDD, GSM, CDMA, WCDMA, WiFi, WLAN, WiMAX, etc.

D2D communication may comprise transmission and/or reception of data. It may be considered that D2D communication may generally comprise and/or be defined by data being transmitted from one terminal, e.g. the transmitter or transmitter terminal, (in particular directly) to another terminal, e.g. the receiver or receiver terminal, in particular without the data transmitted being transmitted and/or relayed via a cellular network and/or base station or radio node of such. D2D communication may comprise relaying and/or hopping via a plurality of terminals. It may be considered that D2D communication is supported by a network, e.g. by the network and/or base station or radio node providing resource allocation, e.g. allocating resource pools for D2D communication. D2D communication may for example comprise D2D discovery transmission and/or D2D data transmission (the data may in particular be user data and/or payload data). Generally, D2D transmissions may be provided on resources used for UL and/or DL transmissions in cellular communication. However, in some variants, the resources may be UL resources (in the cellular context), e.g. as determined by a standard like LTE.

A resource pool may comprise and/or determine a plurality of resources to be available for one or more specific functions and/or one or more and/or an unspecified number of terminals. In particular, a resource pool may comprise resources (resource elements or blocks) available to a terminal without specifically assigning or allocating them to the terminal. A resource pool may pertain to D2D communication and/or to a more specific D2D-related functionality. It may be considered that a resource pool is separated into subpools for specific functionality.

An example of a resource pool is a discovery pool, allowing resources to be used for discovering other terminals interested in and/or available for D2D communication. Such a discovery pool may be a subpool of a resource pool for D2D communication. A resource pool may be allocated and/or configured by a network, e.g. by a radio node of a network. It may be considered that, in particular in out-of-coverage cases, one or more pre-defined resource pools are provided, which may e.g. be pre-defined according to a standard.

Each or any one of the radio nodes or terminals user equipments shown in the figures may be adapted to perform the methods to be carried out by a radio node or terminal/user equipment described herein. Alternatively or additionally, each or any of the radio nodes or terminals/user equipments shown in the figures may comprise any one or any combination of the features of a terminal/user equipment described herein. In this description, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other embodiments and variants that depart from these specific details.

For example, the concepts and variants are partially described in the context of Long Term Evolution (LTE) or LTE-Advanced (LTE-A) mobile or wireless communications technologies; however, this does not rule out the use of the present concepts and aspects in connection with additional or alternative mobile communication technologies such as the Global System for Mobile Communications (GSM). While the following embodiments will partially be described with respect to certain Technical Specifications (TSs) of the Third Generation Partnership Project (3GPP), it will be appreciated that the present concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the embodiments described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. Because the aspects presented herein can be varied in many ways, it will be recognized that any scope of protection should be defined by the scope of the claims that follow without being limited by the description.

The invention claimed is:

1. A method for operating a transmitter terminal, the transmitter terminal being adapted for device-to-device (D2D) communication and/or transmission, the method comprising:

transmitting control information and data in D2D communication, wherein the control information is transmitted within a first resource pool, the first resource pool being a pool of control information resources, wherein the data is transmitted within a second resource pool, the second resource pool being a pool of data resources, wherein transmitting comprises multiplexing the control information and the data based on a mapping, and wherein the mapping associates each control information resource from the first resource pool to the data resources from the second resource pool.

2. The method according to claim 1, wherein the data resources comprise retransmissions of the data according to a time or a frequency pattern.

3. The method according to claim 1, wherein the first resource pool and the second resource pool overlap in time.

4. A transmitter terminal, the transmitter terminal being adapted for device-to-device (D2D) communication and/or transmission; the transmitter terminal further being configured to transmit multiplexed control information and data, wherein the control information is transmitted within a first resource pool, the first resource pool being a pool of control information resources, wherein the data is transmitted within a second resource pool, the second resource pool being a pool of data resources, wherein the control information and the data are multiplexed based on a mapping, and wherein the mapping associates each control information resource from the first resource pool to the data resources from the second resource pool.

5. A receiver terminal, the receiver terminal being adapted for device-to-device (D2D) communication and/or reception, the receiver terminal further being configured to receive control information and data, wherein the control information is received within a first resource pool, the first resource pool being a pool of control information resources, wherein the data is received within a second resource pool, the second resource pool being a pool of data resources, wherein the control information and the data are multiplexed based on a mapping, and wherein the mapping associates each control information resource from the first resource pool to the data resources from the second resource pool.

6. A method for operating a receiver terminal, the receiver terminal being adapted for device-to-device (D2D) communication and/or reception, the method comprising receiving control information and data, wherein the control information is received within a first resource pool, the first resource pool being a pool of control information resources, wherein the data is received within a second resource pool, the second resource pool being a pool of data resources, wherein the control information and data are multiplexed based on a mapping, and wherein the mapping associates each control information resource from the first resource pool to the data resources from the second resource pool.

7. A method for operating a network node for a wireless communication network, the method comprising configuring one or more terminals to perform a method according to claim 6.

* * * * *